(12) United States Patent
Suzuki et al.

(10) Patent No.: US 9,337,633 B2
(45) Date of Patent: May 10, 2016

(54) WATER DRAINING STRUCTURE FOR ELECTRIC WIRE PROTECTION MEMBER

(71) Applicant: YAZAKI CORPORATION, Tokyo (JP)

(72) Inventors: Kenji Suzuki, Shizuoka (JP); Kenji Kajikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/409,110

(22) PCT Filed: Jul. 24, 2013

(86) PCT No.: PCT/JP2013/070067
§ 371 (c)(1),
(2) Date: Dec. 18, 2014

(87) PCT Pub. No.: WO2014/017545
PCT Pub. Date: Jan. 30, 2014

(65) Prior Publication Data
US 2015/0180216 A1     Jun. 25, 2015

(30) Foreign Application Priority Data

Jul. 25, 2012 (JP) ................................ 2012-165182

(51) Int. Cl.
| | |
|---|---|
| *H02G 3/04* | (2006.01) |
| *H02G 3/08* | (2006.01) |
| *B60R 16/02* | (2006.01) |
| *H01R 13/52* | (2006.01) |
| *H01R 13/58* | (2006.01) |
| *H01R 13/629* | (2006.01) |

(52) U.S. Cl.
CPC .......... *H02G 3/0406* (2013.01); *B60R 16/0215* (2013.01); *H01R 13/5227* (2013.01); *H01R 13/5812* (2013.01); *H02G 3/088* (2013.01); *H01R 13/62938* (2013.01)

(58) Field of Classification Search
USPC ............................................ 439/206, 470.34
See application file for complete search history.

(56) References Cited

U.S. PATENT DOCUMENTS

2005/0003698 A1     1/2005  Hata

FOREIGN PATENT DOCUMENTS

| JP | 5-78124 U | 10/1993 |
|---|---|---|
| JP | 2000-102138 A | 4/2000 |
| JP | 2005-19069 A | 1/2001 |
| JP | 2010-68666 A | 3/2010 |

OTHER PUBLICATIONS

Japanese Office Action for the related Japanese Patent Application No. 2012-165182 dated Feb. 16, 2016.
International Search Report and Written Opinion of the International Search Report for PCT/JP2013/070067 dated Sep. 17, 2013.

*Primary Examiner* — Alexander Gilman
(74) *Attorney, Agent, or Firm* — Kenealy Vaidya LLP

(57) ABSTRACT

A water draining structure for an electric wire cover (11) includes: a wall (53) for covering the surroundings of an electric wire to be routed; a pair of slit openings (63) penetrating through the wall (53); and a water guiding protrusion (61) rising from each of adjacent opening edges (55) of the pair of slit openings (63) and protruding from an inner surface (59) of the wall (53) so as to have an apex part (57) of curved surface shape.

2 Claims, 8 Drawing Sheets

WATER DRAINING STRUCTURE FOR ELECTRIC WIRE PROTECTION MEMBER

TECHNICAL FIELD

The present invention relates to a water draining structure for electric wire protection member.

BACKGROUND ART

In an electric wire cover, a protector, or the like serving as an electric wire protection member, a technique is known that a water draining hole is provided for draining, to the outside, water having entered the inside and, at the same time, water from the outside is prevented from directly reaching the water draining hole (see Patent Document 1).

As shown in FIG. 9, this electric wire cover 501 includes a wall surface 503 for enclosing the surroundings of an electric wire pulled out from a connector. Then, a water draining hole 505 penetrating and bending in a crank shape is formed in the wall surface 503. An inner side surface 509 for forming a bent part 507 of the water draining hole 505 is formed in an inclined surface inclined to the outer side as moving in a direction from an upper side connection part 513 connected to a fluid communication hole 511 toward the wall surface inside to a lower side connection part 515 connected to the fluid communication hole 511 toward the wall surface outside.

According to the electric wire cover 501, the water draining hole 505 penetrating and bending in a crank shape is formed in the wall surface 503. Thus, the electric wire cover 501 is realized in which water having entered the inside of the electric wire cover 501 can be drained and further, even when water reaches a wall surface outer side opening part 517 of the water draining hole 505, the water does not easily enter the inside.

PRIOR ART REFERENCES

Patent Document

Patent Document 1: JP-A-2005-19069

DISCLOSURE OF THE INVENTION

Problem to be Solved by the Invention

Nevertheless, in the electric wire cover 501 described above, when the electric wire goes into close contact with a cover inner wall surface 519 owing to vibration or the like, a possibility arises that a wall surface inner side opening part 521 is blocked by the electric wire so that drainage of water is blocked.

The present invention has been devised in view of the above-mentioned situation. An object thereof is to provide a water draining structure for electric wire protection member in which guidance of water to a water draining hole is not blocked by the electric wire.

Means for Solving the Problem

The above-mentioned object of the present invention is achieved by the following configurations.

(1) A water draining structure for electric wire protection member including: a wall that covers a surrounding of an electric wire to be routed; a pair of water draining holes that penetrate through the wall; and a water guiding protrusion that rises from each of adjacent opening edges of the pair of water draining holes and protrudes from an inner surface of the wall in so as to have an apex part of curved surface shape.

According to the water draining structure for electric wire protection member having the configuration of the above-mentioned (1), the water guiding protrusion protrudes from the inner surface of the wall for covering the electric wire. Thus, when the electric wire goes into contact with the apex part of the water guiding protrusion, the electric wire departs from the wall at the contact position so as to be arranged with a gap between itself and the wall. That is, the gap between the wall and the electric wire ensures a movement passage for water. By virtue of this, water flowing on the inner surface of the wall creeps along the movement passage so as to be smoothly guided to the water draining hole without blockage by the electric wire and then is drained to the outward of the electric wire protection member. Further, the water guiding protrusion is formed in a curved surface shape having the apex part. This avoids a situation that the electric wire having gone into contact owing to vibration or the like is damaged.

(2) The water draining structure for electric wire protection member having the configuration of the above-mentioned (1), wherein: the pair of water draining holes are provided along an axis of the electric wire and serve as slit openings respectively extending in a direction intersecting with the axis of the electric wire; and the water guiding protrusion is a protruded rim extending in a direction intersecting with the axis of the electric wire.

According to the water draining structure for electric wire protection member having the configuration of the above-mentioned (2), when a general electric wire having a circular cross section goes into contact with the inner surface of the wall, the electric wire forms line contact with the inner surface. Then, the water draining hole is formed as a slit opening in a direction intersecting with the electric wire. Thus, a portion extending beyond the electric wire in the radial direction necessarily remains as an opening so that the water draining hole is ensured. Thus, in contrast to a case that a slit opening is formed in a direction along the axis of the electric wire, the slit opening is not blocked by the electric wire. Further, the protruded rim serving as the water guiding protrusion is formed in a manner of being inserted between a pair of parallel slit openings. Thus, the electric wire departs from the inner surface of the wall so that each slit opening is opened large. This suppresses occurrence of water drainage resistance caused by the surface tension or the like. Further, since the protruded rim extends in a direction intersecting with the axis of the electric wire, even when the electric wire is moved by vibration or the like, an equivalent slit opening area is ensured so that the water drainage performance is not degraded.

(3) The water draining structure for electric wire protection member having the configuration of the above-mentioned (2), wherein: the wall includes a bottom part extending along the axis of the electric wire and a side part rising from both side edges of the bottom part; the slit openings are provided in both corner parts of the wall formed by the bottom part and the side part; and the protruded rim extends between the slit openings of the both corner parts.

According to the water draining structure for electric wire protection member having the configuration of the above-mentioned (3), the slit openings are formed in the both corner parts with the bottom part in between. Thus, for example, in a case that one electric wire is routed along the corner part, even when the electric wire goes into line contact with the bottom part and the side part simultaneously, the slit opening in a direction intersecting with the electric wire crosses the electric wire and then is opened in both of the bottom part and the side part. By virtue of this, both of water creeping along a gap between the electric wire and the bottom part and water creeping along a gap between the electric wire and the side part can be guided to the slit opening. Further, at that time, the electric wire is separated from the bottom part and the side part by the protruded rim extending between the slit openings so that the slit opening area is ensured large in both of the bottom part and the wall.

The present invention has briefly been described above. Details of the present invention will be clarified further when Best Mode for Carrying Out the Invention (referred to as an "embodiment", hereinafter) given below is read thoroughly with reference to the accompanying drawings.

BEST MODE FOR CARRYING OUT THE INVENTION

Embodiments according to the present invention are described below with reference to the drawings.

A water draining structure according to an embodiment of the present invention is employed in an electric wire cover 11, a protector 73, or the like serving as an electric wire protection member. A first embodiment is described for an example that the electric wire protection member is an electric wire cover 11. The electric wire cover 11 may be applied to a connector such as a low inserting force connector 15 provided with a lever 13 for reducing an inserting force for a counterpart connector (not shown).

Figure 1:
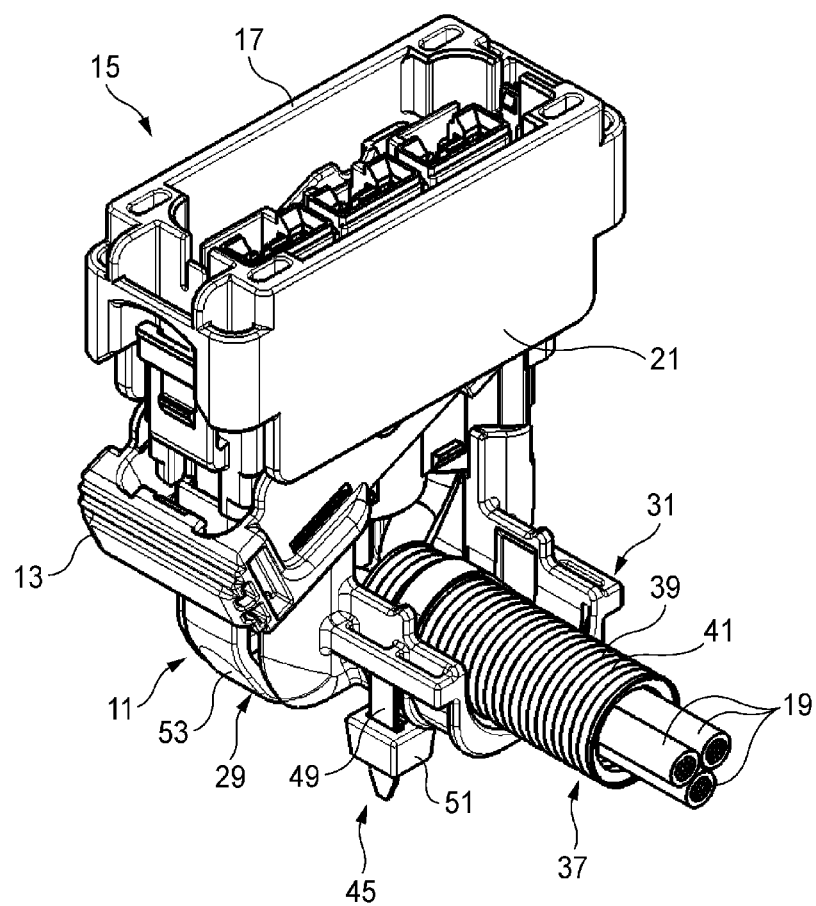
FIG. 1 is a perspective view showing, together with a connector, an electric wire cover employing a water draining structure according to a first embodiment of the present invention.
Figure 2A:
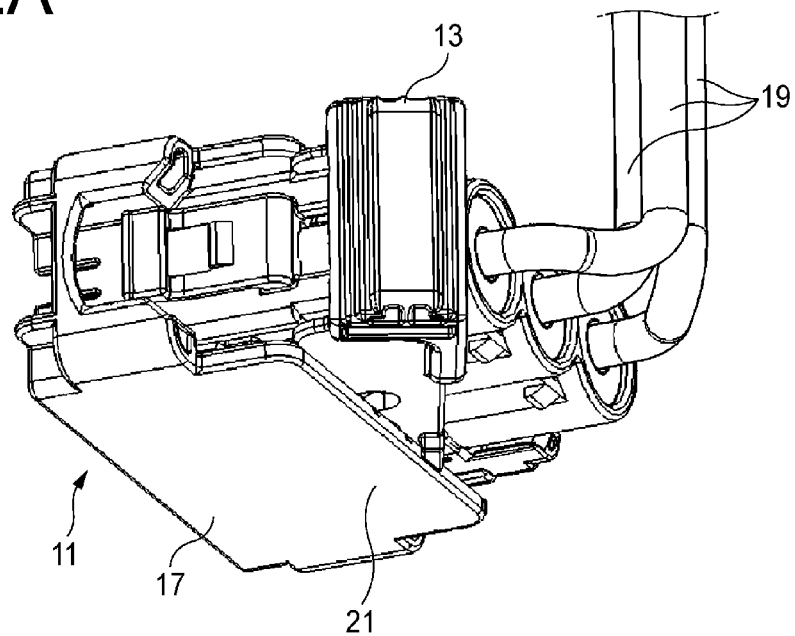
FIG. 2A is a perspective view of a connector shown in FIG. 1, viewed from an electric wire extraction side.
Figure 2B:
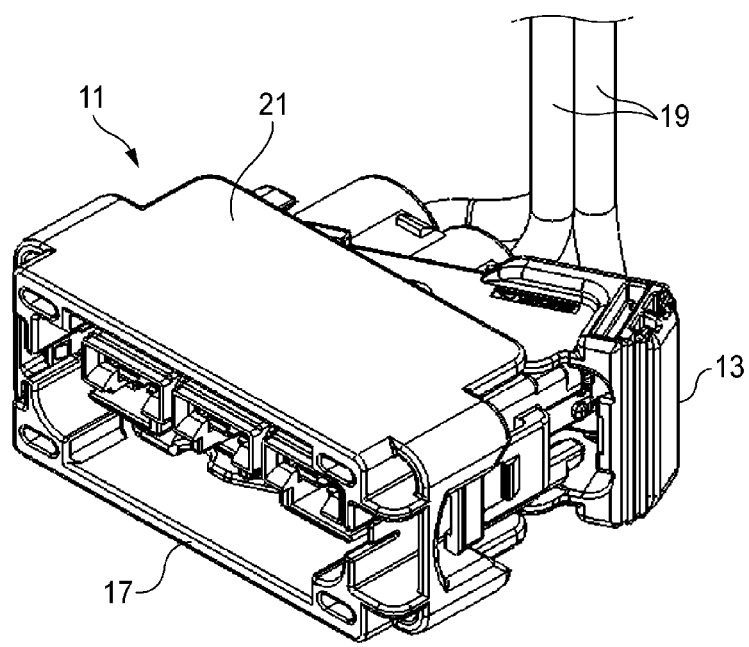
FIG. 2B is a perspective view of a connector shown in FIG. 1, viewed from a counterpart connector linkage side.

As shown in FIGS. 1 to 2B, in the low inserting force connector 15, a connector housing 17 accommodates a plurality of terminals (not shown). An electric wire 19 is connected to each terminal. Then, the electric wire 19 is extracted from a housing rear part 21 on a side opposite to the fitting side for a counterpart connector.

Figure 3:
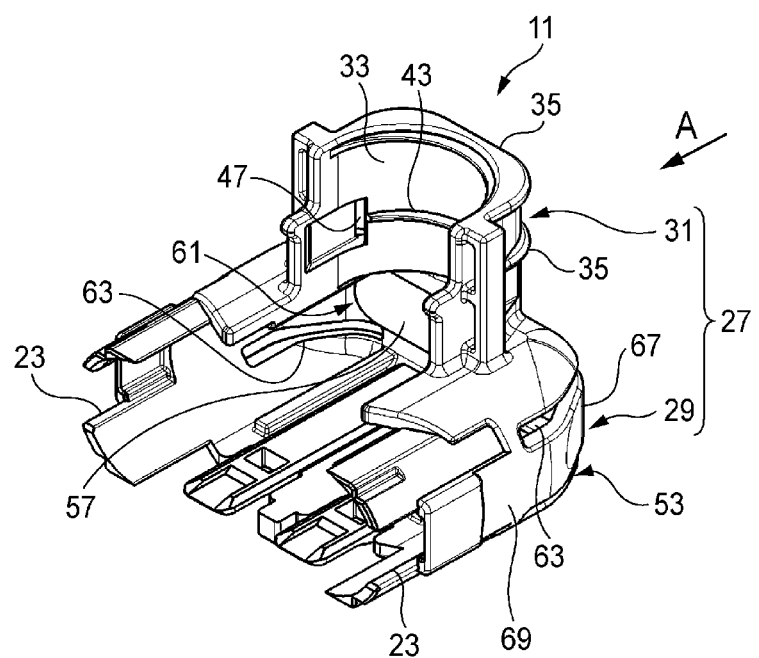
FIG. 3 is a perspective view of an electric wire cover shown in FIG. 1.
Figure 4:
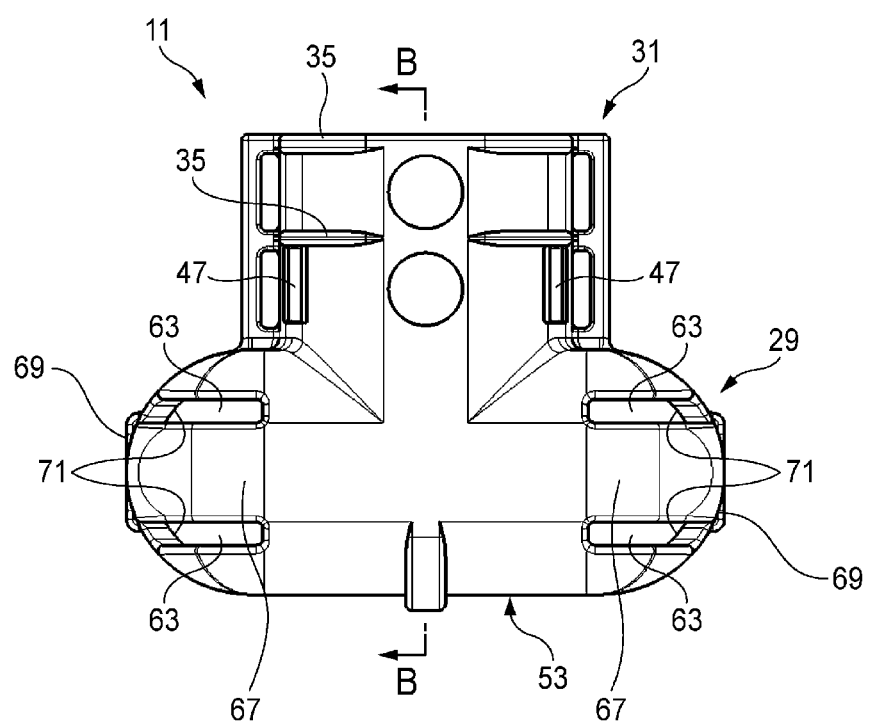
FIG. 4 is a diagram of an electric wire cover shown in FIG. 3, viewed from an arrow A direction.
Figure 5:
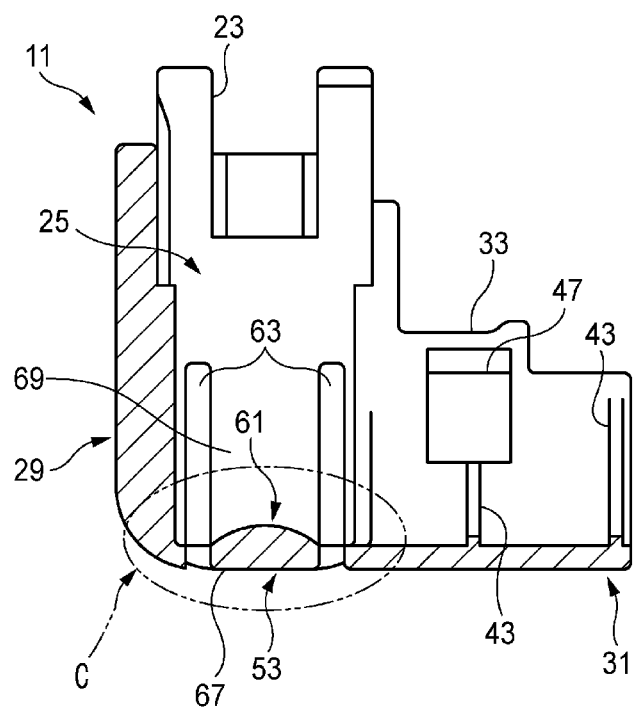
FIG. 5 is a sectional view of an electric wire cover shown in FIG. 4, taken along line B-B and viewed from an arrow direction.

As shown in FIGS. 3 to 5, the electric wire cover 11 is attached to the housing rear part 21 of the connector housing 17 by locking a locking part 23, and then surrounds the electric wire 19 with directing it to a desired direction. In the first embodiment, a plurality of such electric wires 19 extracted from the housing rear part 21 are covered by the electric wire cover 11 in a state of being bent in a direction perpendicular to the direction of connector fitting (in the up and down directions in FIG. 1). That is, the electric wire cover 11 has an electric wire accommodation path 25 (see FIG. 5) bent in an L-shape.

In the electric wire cover 11, a cover body 27 includes: an electric wire accommodation part 29 for accommodating the electric wires 19 immediately after extracted from the housing rear part 21; and a corrugate tube fixing part 31 provided continuously to the electric wire accommodation part 29 and covering the electric wires 19 bent in the perpendicular direction from the electric wire accommodation part 29. The corrugate tube fixing part 31 includes a semi-cylindrical wall 33 in which the electric wires 19 having been extracted are arranged on the inner side. In the semi-cylindrical wall 33, the pedestal end is provided continuously to the cover body 27. Further, the tip side and the side facing the connector housing 17 are opened and the outer periphery is provided with a pair of parallel overhang walls 35 (see FIG. 3) for reinforcement.

The plurality of electric wires 19 going through the inner side of the semi-cylindrical wall 33 are collectively inserted into a corrugate tube 37. That is, the plurality of electric wires 19 are protected by the corrugate tube 37. The corrugate tube 37 is fabricated from synthetic resin and formed in a bellows shape in which groove portions 39 and protruded rim portions 41 in the circumferential direction are arranged alternately in the outer periphery. Further, the corrugate tube 37 has flexibility and can be bent by warpage deformation. When the corrugate tube 37 encloses the surroundings of the electric wires 19 extracted from the housing rear part 21, the electric wires 19 are protected without being exposed to the outside.

In the inner peripheral direction of the semi-cylindrical wall 33, as shown in FIG. 5, a pair of engagement flanges 43 having semi-circular arc shapes are provided in parallel to each other. The engagement flanges 43 protrude inward in the radial direction of the semi-cylindrical wall 33 so as to engage with the outer periphery of the corrugate tube 37.

In each open side in the circumferential direction of the semi-cylindrical wall 33, a band insertion hole 47 is formed through which a bundling band (translator's note: a cable tie) 45 (see FIG. 1) passes. The cable tie 45 is inserted into the band insertion hole 47 and then wound around the corrugate tube 37 so as to fix it to the inner periphery side of the semi-cylindrical wall 33. In the cable tie 45, a buckle part 51 including a locking piece in the inside with is fixed to a pedestal end of a bundling belt 49 (see FIG. 1) fabricated from synthetic resin having flexibility. In the surface of the bundling belt 49, a plurality of locking grooves for locking with the locking piece are formed in the longitudinal direction. In the cable tie 45, when the tip of the bundling belt 49 is inserted into the through hole of the buckle part 51, dropping out is restricted by the locking piece so that the corrugate tube 37 arranged in the inside of the loop is fixed to the semi-cylindrical wall 33.

Figure 6:
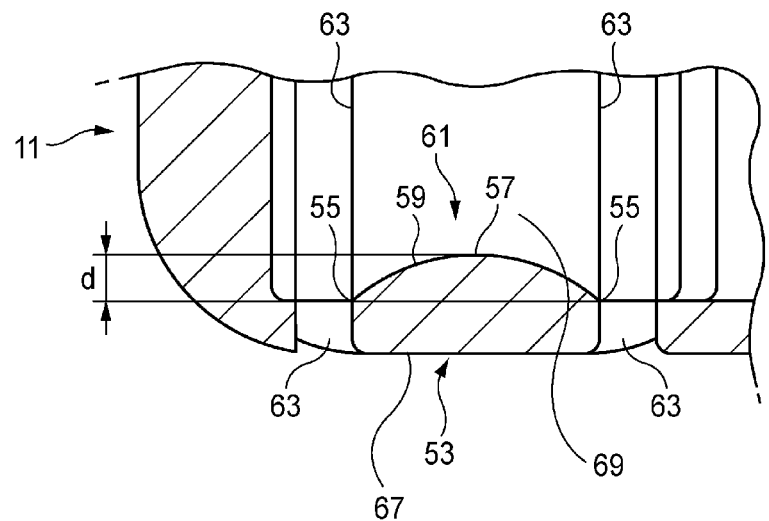
FIG. 6 is an enlarged view of part C of an electric wire cover shown in FIG. 5.

The electric wire accommodation part 29 includes: a wall 53 for covering the surroundings of the electric wires 19 to be routed; slit openings 63 serving as a pair of water draining holes penetrating through the wall 53; and a water guiding protrusion 61 rising from each of adjacent opening edges 55 (see FIG. 6) of the pair of slit openings 63 and then protruding from an inner surface 59 of the wall 53 in a manner of having an apex part 57 of curved surface shape.

The pair of slit openings 63 are provided along the axis of the electric wire 19 and respectively extend in a direction intersecting with the axis of the electric wire 19. Further, the water guiding protrusion 61 of the present embodiment is formed in a protruded rim extending in a direction intersecting with the axis of the electric wire 19.

The wall 53 includes: a bottom part 67 (see FIGS. 4 and 5) extending along the axis of the electric wire 19; and a side part 69 rising from both side edges of the bottom part 67. The slit openings 63 are provided in the both corner parts 71 (see FIG. 4) of the wall 53 formed by the bottom part 67 and the side part 69. The water guiding protrusion 61 extends between the slit openings 63 of the both corner parts 71.

Next, operation of the water draining structure having the above-mentioned configuration is described below.

Figure 7:
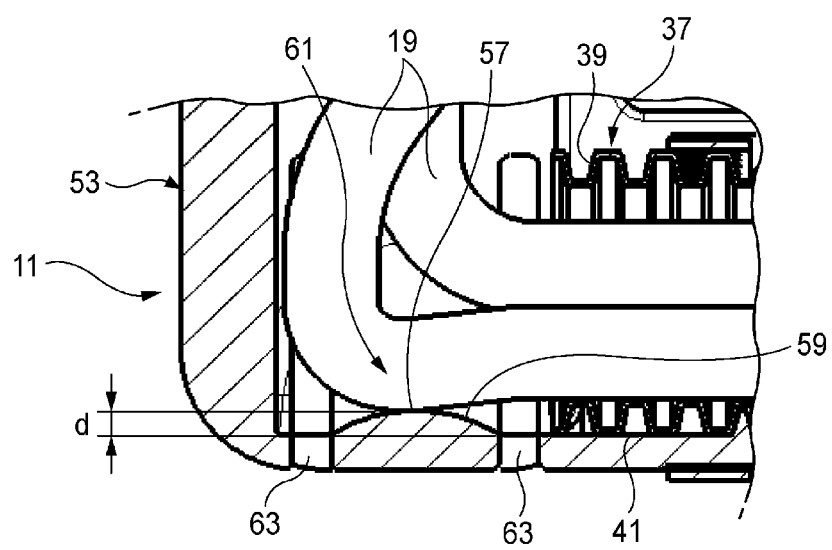
FIG. 7 is an enlarged view of a main part of an electric wire cover through which an electric wire is going.

As shown in FIG. 7, in the water draining structure for the electric wire cover 11 according to the first embodiment described above, the water guiding protrusion 61 protrudes from the inner surface 59 of the wall 53 for covering the electric wire 19. Thus, when the electric wire 19 goes into contact with the apex part 57 of the water guiding protrusion 61, the electric wire 19 departs from the wall 53 at the contact position so as to be arranged with a gap d between itself and the wall 53. That is, the gap d between the wall 53 and the electric wire 19 ensures a movement passage for water. By virtue of this, water flowing on the inner surface 59 of the wall 53 creeps along the movement passage so as to be smoothly guided to the slit openings 63 without blockage by the electric wire 19 and then is drained to the outward of the electric wire cover 11. Further, the water guiding protrusion 61 is formed in a curved surface shape having the apex part 57. This avoids a situation that the electric wire 19 having gone into contact owing to vibration or the like is damaged.

Further, when the electric wire 19 having a circular cross section goes into contact with the inner surface 59 of the wall 53, the electric wire 19 forms line contact with the inner surface 59. Then, since the slit openings 63 extend in a direction intersecting with the electric wire 19. Thus, a portion extending beyond the electric wire 19 in the radial direction necessarily remains as an opening so that the slit openings 63 are ensured. Thus, in contrast to a case that a slit opening is formed in a direction along the electric wire 19, the slit openings 63 are not blocked by the electric wire 19.

Further, the water guiding protrusion 61 constructed as the protruded rim is formed in a manner of being inserted between the pair of parallel slit openings 63. Thus, the electric wire 19 departs from the inner surface 59 of the wall 53 so that each slit opening 63 is opened large. This suppresses occurrence of water drainage resistance caused by the surface tension or the like. Further, since the water guiding protrusion 61 extends in a direction intersecting with the axis of the electric wire 19, even when the electric wire 19 is moved by vibration or the like, an equivalent slit opening area is ensured so that the water drainage performance is not degraded.

Further, the slit openings 63 are formed in the both corner parts 71 (see FIG. 4) with the bottom part 67 in between. Thus, for example, in a case that one electric wire 19 is routed along the corner part 71, even when the electric wire 19 goes into line contact with the bottom part 67 and the side part 69 simultaneously, the slit opening 63 in a direction intersecting with the electric wire 19 crosses the electric wire 19 and then is opened in both of the bottom part 67 and the side part 69. By virtue of this, both of water creeping along the gap d between the electric wire 19 and the bottom part 67 and water creeping along the gap d between the electric wire 19 and the side part 69 can be guided to the slit opening 63. Further, at that time, the electric wire 19 is separated from the bottom part 67 and the side part 69 by the water guiding protrusion 61 extending between the slit openings 63 so that the slit opening area of the slit openings 63 is ensured large in both of the bottom part 67 and the wall 53.

Figure 8:
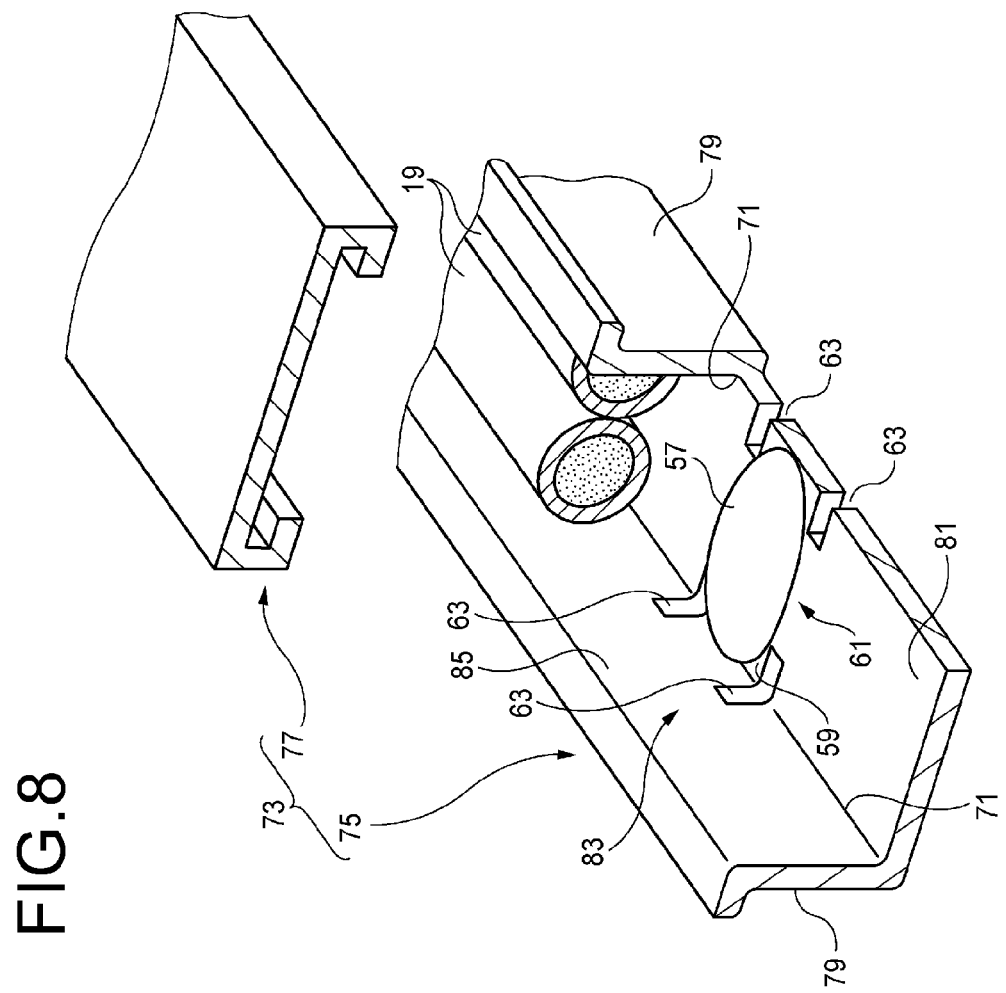
FIG. 8 is a partly broken perspective view of a protector employing a water draining structure according to a second embodiment of the present invention.
Figure 9:
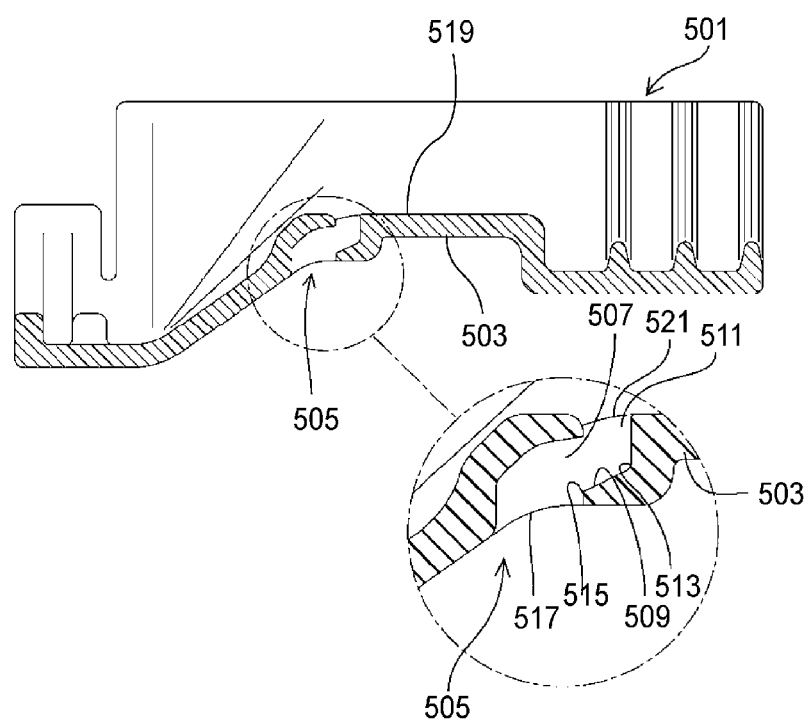
FIG. 9 is a longitudinal sectional view of an electric wire cover employing a water draining hole of the conventional art.

Next, a protector 73 employing a water draining structure according to a second embodiment of the present invention is described below with reference to FIG. 8.

The first embodiment given above has been described for an example that the water draining structure is employed in the electric wire cover 11. Then, the water draining structure of the present invention is preferably applicable also to a protector 73 as described below in a second embodiment.

In a wire harness for automobile, because of path regulation or for the purpose of protection feature enhancement for important electric wires, in necessary wire routing regions, electric wires 19 are inserted in a protector 73 serving as an electric wire protection member fabricated as a resin molded article. The protector 73 is formed in a tubular shape obtained by combining a gutter-shaped body 75 and a cover 77 with each other.

The body 75 includes both side parts 79 that rise from both sides along the longitudinal direction of a long bottom plate part 81 formed along the electric wire 19 and that are separated from each other with the electric wire 19 in between. That is, in the body 75, the cross section taken in a direction perpendicular to the longitudinal direction has a U-shape whose upper side is opened. The upper open part serves as a body opening part 85 for opening an electric wire accommodation space 83 on the body inner side.

Then, in the protector 73 including the bottom plate part 81 extending along the axis of the electric wire 19 and the both side parts 79 rising from both side edges of the bottom plate part 81, the pair of slit openings 63 are provided in the both corner parts 71 formed by the bottom part 81 and both side parts 79. Further, the water guiding protrusion 61 extends between the pair of slit openings 63 of the both corner parts 71.

By virtue of this, similarly to the above-mentioned electric wire cover 11, water flowing on the inner surface 59 of the body 75 creeps along the movement passage so as to be smoothly guided to the slit openings 63 without blockage by the electric wire 19 and then is drained to the outward of the protector 73. Further, the water guiding protrusion 61 is formed in a curved surface shape having the apex part 57. This avoids a situation that the electric wire 19 having gone into contact owing to vibration or the like is damaged.

Thus, according to the water draining structure for the electric wire cover 11 and the protector 73 of the above-mentioned embodiments, a situation can be prevented that guidance of water to the slit openings 63 serving as water draining holes is blocked by the electric wire 19.

Here, the features of the embodiments of the water draining structure for electric wire protection member according to the present invention described above are briefly listed below.

[1] A water draining structure for an electric wire protection member (an electric wire cover) 11 including: a wall 53 that covers a surrounding of an electric wire 19 to be routed; a pair of water draining holes (slit openings) 63 that penetrate through the wall 53; and a water guiding protrusion 61 that rises from each of adjacent opening edges 55 of the pair of water draining holes (slit openings) 63 and protrudes from an inner surface 59 of the wall 53 so as to have an apex part 57 of curved surface shape.

[2] The water draining structure for an electric wire protection member (an electric wire cover) 11 having the configuration of the above-mentioned [1], wherein: the pair of water draining holes (slit openings) 63 are provided along an axis of the electric wire 19 and serve as the slit openings 63 respectively extending in a direction intersecting with the axis of the electric wire 19; and the water guiding protrusion 61 is a protruded rim extending in a direction intersecting with the axis of the electric wire 19.

[3] The water draining structure for an electric wire protection member (a protector) 73 having the configuration of the above-mentioned [2], wherein: the wall includes a bottom part 67 extending along the axis of the electric wire 19 and a side part 69 rising from both side edges of the bottom part 67; the slit openings 63 are provided in both corner parts 71 of the wall formed by the bottom part 67 and the side part 69; and the protruded rim extends between the slit openings 63 of the both corner parts 71.

Here, the water draining structure for electric wire protection member according to the present invention is not limited to the embodiments described above and modifications, improvements, and the like may be made appropriately. In addition, the construction material, the shape, the dimension, the number, the arrangement position, and the like of each component in the embodiments described above may be arbitrary and is not limited as long as the present invention can be achieved.

Further, the present application is based on Japanese patent application (Patent Application No. 2012-165182) filed on Jul. 25, 2012. The contents thereof are incorporated herein by reference.

INDUSTRIAL APPLICABILITY

According to the water draining structure for electric wire protection member according to the present invention, a situation can be prevented that guidance of water to a water draining hole is blocked by an electric wire.

DESCRIPTION OF REFERENCE NUMERALS

11 . . . electric wire cover (electric wire protection member)
19 . . . electric wire
53 . . . wall
55 . . . opening edge
57 . . . apex part
59 . . . inner surface
61 . . . water guiding protrusion
63 . . . slit opening (water draining hole)
67 . . . bottom part
69 . . . side part
71 . . . corner part
73 . . . protector (electric wire protection member)

The invention claimed is:

1. A water draining structure for electric wire protection member, comprising:
a wall that covers a surrounding of an electric wire to be routed;
a pair of water draining holes that penetrate through the wall; and
a water guiding protrusion that rises from each of adjacent opening edges of the pair of water draining holes and protrudes from an inner surface of the wall so as to have an apex part of curved surface shape, wherein the pair of water draining holes are provided along an axis of the electric wire and serve as slit openings respectively extending in a direction intersecting with the axis of the electric wire; and wherein the water guiding protrusion is a protruded rim extending in a direction intersecting with the axis of the electric wire.

2. The water draining structure for electric wire protection member according to claim 1, wherein the wall includes a bottom part extending along the axis of the electric wire and a side part rising from both side edges of the bottom part;
wherein the slit openings are provided in both corner parts of the wall formed by the bottom part and the side part; and
wherein the protruded rim extends between the slit openings of the both corner parts.

* * * * *